(No Model.)  3 Sheets—Sheet 1.
G. P. & R. B. JAMESON.
AUTOMATIC GRAIN SCALE.
No. 395,057.  Patented Dec. 25, 1888.
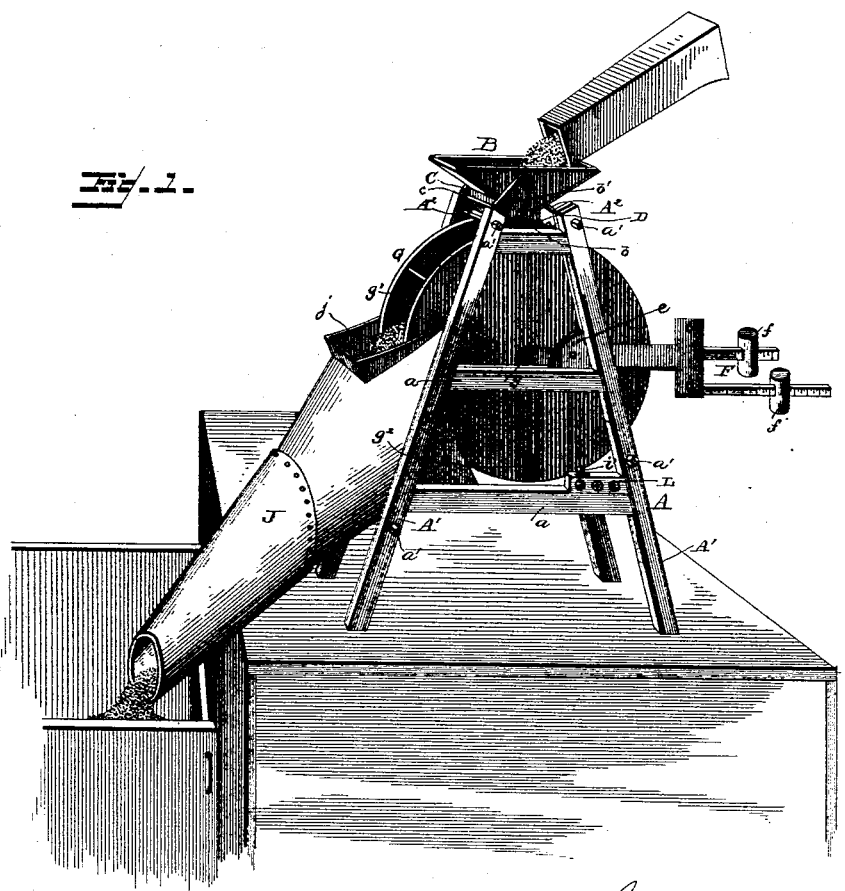
WITNESSES,
Edwin T. Yewell.
Wm. J. Littell
INVENTORS,
George P. Jameson
Robert B. Jameson
by
J. R. Littell,
Attorney (No Model.) 3 Sheets—Sheet 2.

G. P. & R. B. JAMESON.
AUTOMATIC GRAIN SCALE.

No. 395,057. Patented Dec. 25, 1888.

WITNESSES.
Edwin L. Yewell,
Wm. J. Littell,

INVENTORS.
George P. Jameson
Robert B. Jameson
by J. R. Littell, Attorney.

(No Model.) 3 Sheets—Sheet 3.

G. P. & R. B. JAMESON.
AUTOMATIC GRAIN SCALE.

No. 395,057. Patented Dec. 25, 1888.

WITNESSES,
Edwin T. Yewell
Wm. J. Littell

INVENTORS,
G. P. Jameson
R. B. Jameson
by J. R. Littell, Attorney.

UNITED STATES PATENT OFFICE.

GEORGE P. JAMESON AND ROBERT B. JAMESON, OF ABINGDON, ILLINOIS.

AUTOMATIC GRAIN-SCALE.

SPECIFICATION forming part of Letters Patent No. 395,057, dated December 25, 1888.

Application filed June 28, 1888. Serial No. 278,401. (No model.)

*To all whom it may concern:*

Be it known that we, GEORGE P. JAMESON and ROBERT B. JAMESON, citizens of the United States, residing at Abingdon, in the county of Knox and State of Illinois, have invented certain new and useful Improvements in Grain Weighers and Registers; and we do hereby declare that the following is a full, clear, and exact description of the invention, which will enable others skilled in the art to which it appertains to make and use the same.

This invention relates to that class of grain-weighing and registering machines designed to operate automatically; and it has for its object to provide an improved device of this character, whereby the quantity of grain to be weighed and registered can be regulated, and will possess advantages in point of simplicity, inexpensiveness, durability, and general efficiency.

Figure 3:
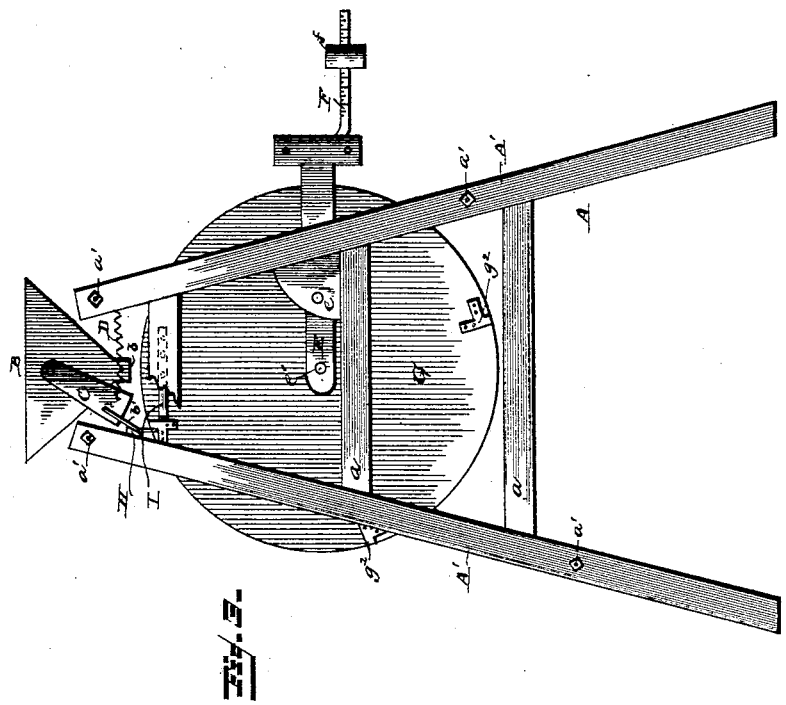
Figure 2:
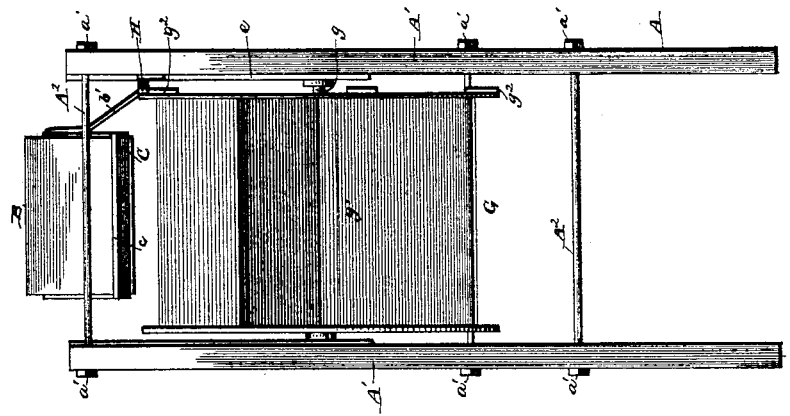
Figure 4:
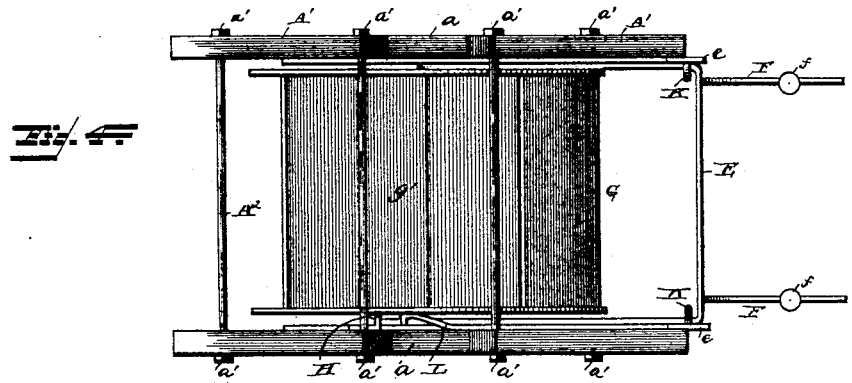
Figure 5:
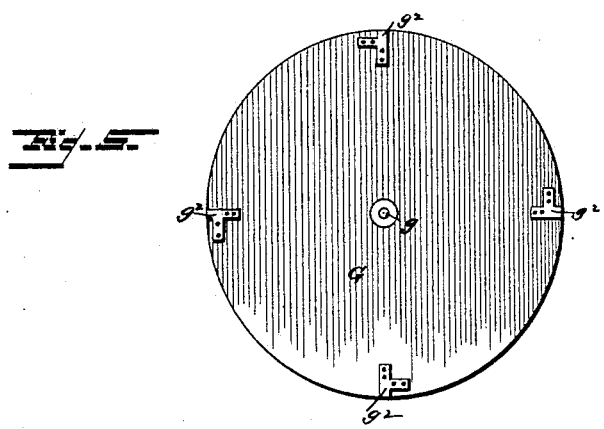
Figure 6:
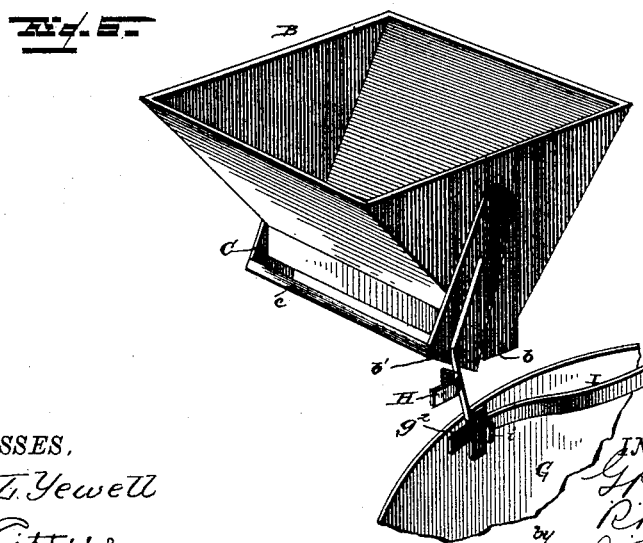

In the drawings, Figure 1 is a perspective view of a grain-weighing and registering machine embodying our invention. Fig. 2 is a front end elevation, with the chute removed. Fig. 3 is a side elevation, parts of the frame being broken away. Fig. 4 is a top or plan view, the hopper being removed. Fig. 5 is a side elevation of the cylinder. Fig. 6 is a detail perspective view of the hopper and cut-off.

Corresponding parts in the figures are denoted by the same letters of reference.

Referring to the drawings, A designates the frame, composed of two sections, each having two downwardly-divergent standards, A' A', connected by cross-strips $a\ a$. The sections are parallel with each other, and are connected by transverse rods $A^2$, having screw-threaded ends, upon which are disposed nuts $a'$, one at each side the standards.

Secured between the two top rods, $A^2$, is a hopper, B, having a flaring mouth and a transverse feed-opening, $b$, in its lower end closed by a cut-off, C, which is normally held over the opening $b$ of the hopper by gravity or by a spring, D, connected therewith and with the frame. The cut-off is preferab'y provided with a flange, $c$, at its front edge, adapted to engage the lower edge of the hopper to limit the rearward movement of said cut-off. A downwardly-projecting arm, $b'$, is secured to one side of the cut-off, which, when the latter is open, engages a lug or projection, H, on the frame, the purpose of which will be hereinafter described.

Pivoted in plates $e$, secured to the frame, is an approximately U-shaped yoke, E, provided at its rear portion with scale-beams F, preferably two in number, having weights $f$ disposed thereon, one of which is designed to balance the cylinder, while the quantity of grain to be weighed or measured is regulated by the other. The rear portion of the yoke passes through suitable guides, K, substantially as shown, projecting from the plate $e$, which limits the play of the yoke.

G designates a cylinder, which is substantially the same as that shown in patent numbered 275,163, dated December 20, 1887, and granted to George P. Jameson. It consists of two corresponding circular side plates, from the outer face of which project the axes $g\ g$, bearing in perforations $e'\ e'$ in the ends of the yoke, and radial partitions dividing the cylinder into equal compartments, $g'$, adapted to received the grain as it falls from the hopper.

From the outer face of the cylinder, at the side nearest the arm $b$ of the cut-off, are provided lugs $g^2$, corresponding in number to the compartments $g'$. These lugs are preferably formed by angular plates, and engage during the revolution of the cylinder the arm $b'$ of the cut-off, said arm engaging the lug or projection H to retain the cylinder against rotation until released by the weight of the grain in the upper compartment. Backward rotation of the cylinder is prevented by the flanged end $i$ of a spring-plate, I, secured to the frame, said flanged end engaging the lug $g^2$ at the top of the cylinder when its respective compartment is in position to receive the grain.

J designates a chute, suitably connected with the frame, provided with a flaring mouth, $j$, said chute being located in such a manner as to receive the grain as it falls from the cylinder.

Upon the frame is secured a register, L, of any suitable construction, provided with an operating-lever, $i'$, which is adapted to be engaged by the lugs $g^2$ as the cylinder rotates.

The operation and advantages of our invention will be readily understood by those skilled in the art to which it appertains. When one of the compartments is in position to receive the grain, the major part of said compartment is at the forward side of the cylinder-axes. While in this position the lug of said compartment is in engagement with the arm of the cut-off, retaining the latter free of the feed-opening, and at the same time preventing the cylinder from turning forward, the spring-plate I holding the cylinder against backward movement. After a sufficient quantity of grain has been received by the compartment to overcome the weight at the rear portion of the yoke, the cylinder drops by gravity out of contact with the arm of the cut-off, and is caused to turn forward by the weight of the grain at the forward side of the axes a sufficient distance to discharge the load and bring the next compartment into the position just described. As soon as the cut-off is freed it returns to its normal position over the feed-opening, closing it until the next compartment is in position to receive the grain. As the cylinder turns, one of the lugs comes in contact with the lever of the register, operating the same, the latter indicating the number of compartments that have been filled. The quantity of grain to be weighed or measured is regulated by the adjustment of the weights upon the scale-beams.

It is obvious that the device can be used alone or in connection with an elevator and separator or other machine, and that it can be constructed of sufficient size for weighing coal or other material.

We claim as our invention—

1. The combination, with the frame, of a hopper mounted thereon and provided with a cut-off for normally closing the feed-opening of the same, said cut-off comprising the horizontal plate, from the ends of which extend at right angles thereto arms pivoted to the hopper, the upturned flange at the front edge of the plate, and an arm projecting downwardly from one of the pivoted arms, and a rotatable cylinder provided upon one side with lugs adapted to engage the projecting arm to remove the cut-off from the feed-opening, substantially as and for the purpose set forth.

2. The combination, with the frame, of a hopper mounted thereon, a cut-off for said hopper comprising a horizontal plate, arms extending from the ends thereof at right angles thereto and pivoted to the hopper, an upright flange at the front edge of the plate, a downwardly-extending arm projecting from one of the pivoted arms and adapted to be engaged by lugs upon a rotatable cylinder, and a spring secured at one end to the cut-off and at the other to the frame, said spring being adapted to normally retain the cut-off in contact with the feed-opening of the hopper, substantially as set forth.

3. The herein-described machine for weighing and registering grain, comprising a frame, a hopper mounted thereon and provided with a cut-off having an arm, a rotatable cylinder divided into compartments and mounted in the ends of a yoke, said yoke being pivoted in the frame and provided at its rear portion with scale-beams, lugs upon the cylinder adapted to engage the arm of the cut-off and a spring upon the frame, and a chute for receiving the grain as it is discharged from the cylinder, all arranged and adapted to operate substantially as and for the purpose set forth.

4. A weighing and registering machine comprising a frame, a hopper disposed thereon, a spring-actuated cut-off pivoted to the hopper and provided with an arm, a yoke pivoted to the frame and provided at its rear portion with weights and at its ends with perforations, a cylinder-bearing in said perforations and divided into compartments, and lugs upon one side of the cylinder adapted to engage the arm of the cut-off and a spring upon the frame, substantially as set forth.

In testimony whereof we affix our signatures in presence of two witnesses.

GEO. P. JAMESON.
ROBERT B. JAMESON.

Witnesses:
JAMES BELLWOOD,
K. R. MARKS.